United States Patent
Hameed et al.

(10) Patent No.: US 9,214,797 B2
(45) Date of Patent: Dec. 15, 2015

(54) APPARATUS, SYSTEMS, AND METHODS FOR OPERATION OF A TRIP UNIT IN A CIRCUIT PROTECTION DEVICE

(71) Applicant: General Electric Company, Schenectady, NY (US)

(72) Inventors: Zubair Hameed, Louisville, KY (US); Craig Benjamin Williams, Louisville, KY (US); Timothy Ray Jackson, Louisville, KY (US); Todd Elliott Greenwood, Pewee Valley, KY (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 13/766,223

(22) Filed: Feb. 13, 2013

(65) Prior Publication Data
US 2014/0226248 A1 Aug. 14, 2014

(51) Int. Cl.
*H02H 1/00* (2006.01)
*H02H 3/44* (2006.01)
*H02H 3/10* (2006.01)
*H02H 3/04* (2006.01)

(52) U.S. Cl.
CPC .................. *H02H 1/00* (2013.01); *H02H 3/044* (2013.01); *H02H 3/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,128,804 A * | 12/1978 | Russell | .................. | H02H 3/044 324/424 |
| 4,428,022 A | 1/1984 | Engel et al. | | |
| 5,311,392 A * | 5/1994 | Kinney et al. | ................. | 361/93.2 |
| 5,335,135 A | 8/1994 | Kinney | | |
| 5,369,356 A | 11/1994 | Kinney et al. | | |
| 6,018,451 A * | 1/2000 | Lyke et al. | .................... | 361/93.2 |
| 6,167,329 A | 12/2000 | Engel et al. | | |
| 6,175,780 B1 | 1/2001 | Engel | | |
| 7,649,468 B2 * | 1/2010 | Gordon | .................. | G08B 21/14 340/620 |
| 7,898,118 B2 | 3/2011 | Nitsche et al. | | |
| 2003/0187520 A1* | 10/2003 | Pearlman | .................. | G06F 1/12 700/11 |
| 2005/0162796 A1 | 7/2005 | Arenz et al. | | |
| 2007/0216468 A1* | 9/2007 | Duarte | .......................... | 327/513 |
| 2008/0067876 A1 | 3/2008 | Nitsche et al. | | |
| 2011/0128005 A1 | 6/2011 | Weiher | | |
| 2011/0148423 A1* | 6/2011 | Richards et al. | .............. | 324/424 |
| 2012/0226453 A1* | 9/2012 | Williams et al. | ................ | 702/58 |
| 2013/0035772 A1* | 2/2013 | Pearson et al. | .................. | 700/20 |
| 2013/0193943 A1* | 8/2013 | Wilson | .......................... | 323/284 |
| 2014/0063876 A1* | 3/2014 | Buckey et al. | .................. | 363/50 |

FOREIGN PATENT DOCUMENTS

EP 0 949 733 B1 5/2011

* cited by examiner

*Primary Examiner* — Thienvu Tran
*Assistant Examiner* — Angela Brooks
(74) *Attorney, Agent, or Firm* — General Electric Company

(57) ABSTRACT

Apparatus, systems, and methods for operation of an electronic trip unit are described. One example is a method for use in operating an electronic trip unit including a first controller. The first controller is configured to selectively operate a tripping device coupled between an input terminal and an output terminal of the electronic trip unit. The method includes receiving, by a second controller, a plurality of health signals from the first controller. The second controller determines an existence of an undesired condition based on at least one of the plurality of different health signals, and determines a first action to be taken to remedy the undesired condition.

20 Claims, 4 Drawing Sheets

APPARATUS, SYSTEMS, AND METHODS FOR OPERATION OF A TRIP UNIT IN A CIRCUIT PROTECTION DEVICE

BACKGROUND

The field of the invention relates generally to circuit protection devices, and more specifically, to apparatus, systems, and methods for monitoring and operating a trip unit in a circuit protection device.

Circuit breakers are often used to protect, in a residential or commercial environment, against overcurrent conditions and/or ground fault conditions. In some circuit breakers, an electronic control system, referred to as a trip unit or an electronic trip unit, monitors one or more characteristics of electrical power to detect the presence of overcurrent conditions and causes an operating mechanism to separate circuit breaker contacts upon detection of an overcurrent condition by the trip unit. Separating the circuit breaker contacts, generally referred to as "tripping" the circuit breaker, interrupts the flow of current through the circuit breaker.

Some known systems include a watchdog circuit to monitor continued operation of the trip unit. The trip unit in such systems transmits a periodic signal, referred to as a watchdog signal, to indicate that it is still functioning. If the watchdog circuit does not receive the watchdog signal from the trip unit when expected, the watchdog circuit resets (i.e., turns off and restarts) the trip unit and/or trips the circuit breaker.

BRIEF DESCRIPTION

In one aspect, a circuit protection device is configured to receive a power input and provide a power output. The circuit protection device includes an input terminal to receive the power input, an output terminal to provide the power output, a tripping device coupled between the input terminal and the output terminal, and a trip unit. The trip unit includes a first controller and a second controller communicatively coupled to the first controller and the tripping device. The first controller is configured to monitor at least one characteristic associated with the power input, control the tripping device based at least in part on the monitored characteristic, and output a plurality of different health signals associated with the first controller. The second controller is configured to determine, based at least in part on at least one of the plurality of different health signals, a first action to be taken with respect to at least one of the first controller and the tripping device.

Another aspect is a method for use in operating an electronic trip unit including a first controller configured to selectively operate a tripping device coupled between an input terminal and an output terminal of a circuit protection device. The method includes receiving, by a second controller, a plurality of different health signals from the first controller. The second controller determines a first action to be taken with respect to at least one of the first controller and the tripping device in response to at least one of the plurality of different health signals.

Yet another aspect is a trip unit for use with a circuit protection device, the circuit protection device including an input terminal, an output terminal, and a tripping device coupled between the input terminal and the output terminal, said trip unit comprising a first controller and a second controller communicatively coupled to the first controller and the tripping device. The first controller is configured to control the tripping device and output a plurality of different health signals associated with the first controller. The second controller is configured to determine, in response to an absence of at least one of the plurality of different health signals, a plurality of actions to be taken with respect to at least one of the first controller and the tripping device.

DETAILED DESCRIPTION

The apparatus, systems, and methods described herein facilitate operation of, and monitoring, a trip unit in a circuit protection device including a first controller and a second controller. Technical effects of the embodiments described herein include at least one of: (a) receiving, by the second controller in the trip unit, a plurality of different health signals from the first controller in the trip unit; and (b) determining, by the second controller, a first action to be taken with respect to at least one of the first controller and a tripping device in response to at least one of the plurality of different health signals.

Figure 1:
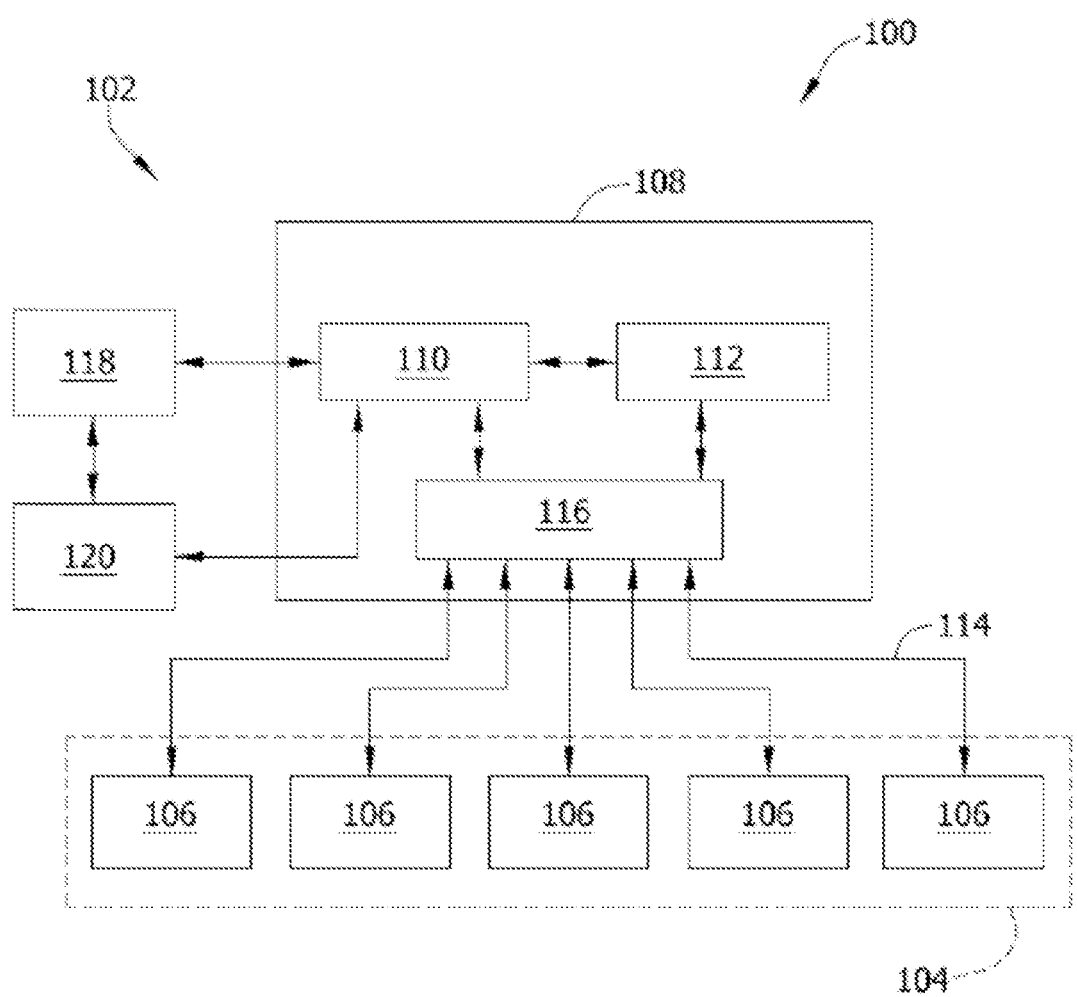
FIG. 1 is a schematic block diagram of an exemplary power system.

FIG. 1 is a schematic block diagram of an exemplary power system 100 that includes an equipment protection system 102 and a distribution system 104. In an exemplary embodiment, distribution system 104 includes a plurality of switchgear units 106. Protection system 102 includes a central controller 108 that includes a processor 110 and a memory 112 coupled to processor 110. Processor 110 controls and/or monitors operation of switchgear units 106. More specifically, processor 110 controls and/or monitors operation of a plurality of circuit breakers and trip units (neither shown in FIG. 1) within switchgear units 106. Processor 110 communicates with switchgear units 106 through a network 114. For example, central controller 108 includes a central communication unit 116 that enables transmitting and receiving data and/or commands between processor 110 and switchgear units 106 through network 114.

It should be understood that the term "processor" refers generally to any programmable system including systems and microcontrollers, reduced instruction set circuits (RISC), application specific integrated circuits (ASIC), programmable logic circuits, field programmable gate array (FPGA), gate array logic (GAL), programmable array logic (PAL), and any other circuit or processor capable of executing the functions described herein. The above examples are exemplary only, and thus are not intended to limit in any way the definition and/or meaning of the term "processor."

Memory 112 stores program code and instructions, executable by processor 110, to control and/or monitor switchgear units 106. Memory 112 may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 112. Memory 112 may also be, or include, a detachable or removable memory, including, but not limited to, a suitable cartridge, disk, CD ROM, DVD or USB memory.

In an exemplary embodiment, protection system 102 includes a display device 118 and a user input device 120 that provide a user interface for monitoring and controlling distribution system 104 using protection system 102. Display device 118 may include, without limitation, a monitor, a television display, a plasma display, a liquid crystal display (LCD), a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, display device 118 includes a touch-screen with an associated touch-screen controller. Display device 118 may be of any suitable configuration, such as a square, a rectangle or an elongated rectangle. User input device 120 includes, without limitation, a keyboard, a keypad, a touch-sensitive screen, a mouse, a scroll wheel, a pointing device, an audio input device employing speech-recognition software, and/or any suitable device that enables a user to input data into power distribution system 104.

Figure 2:
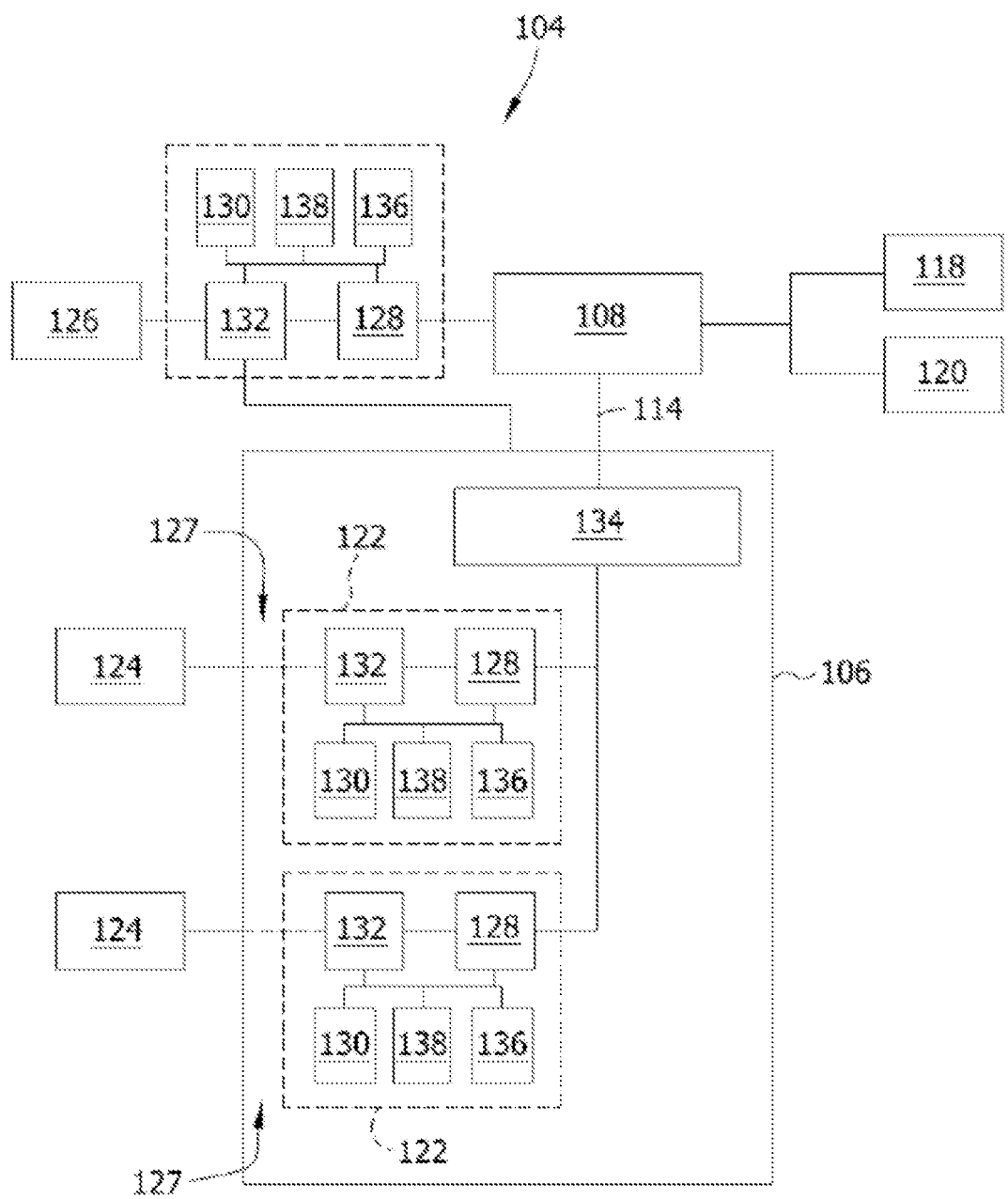
FIG. 2 is a schematic block diagram of an exemplary power distribution system that may be used with the power system shown in FIG. 1.

FIG. 2 is a schematic block diagram of power distribution system 104 including a plurality of circuit protection devices 122. Each circuit protection device 122 is removably coupled within switchgear unit 106 and is configured to control power to one or more loads 124. In an exemplary embodiment, circuit protection device 122 is an electronic trip unit (ETU) 122, also referred to herein as a trip unit 122.

Loads 124 may include, but are not limited to only including, machinery, motors, lighting, and/or other electrical and mechanical equipment of a manufacturing or power generation or distribution facility. Power is provided to switchgear unit 106 from a main power feed 126, which is also coupled to circuit protection device 122. The power is then divided into a plurality of branch circuits 127 using circuit protection devices 122 for providing power to loads 124.

Each circuit protection device 122 includes a control system 128, as well as at least one sensor 130 and at least one tripping device 132, such as one or more circuit breakers or arc containment devices coupled to control system 128. Exemplary circuit breakers include, for example, circuit switches and/or circuit interrupters that interrupt current flow through the circuit breaker to a load coupled to the circuit breaker. An exemplary arc containment device includes, for example, a containment assembly, a plurality of electrodes, a plasma gun, and a trigger circuit that causes the plasma gun to emit ablative plasma into a gap between the electrodes to divert energy into the containment assembly from an arc or other electrical fault that is detected on the circuit.

Sensor 130 measures at least one operating condition of tripping device 132 and/or of circuit protection device 122. In an exemplary embodiment, sensor 130 is a current sensor, such as a current transformer, a Rogowski coil, a Hall-effect sensor, and/or a shunt that measures a current flowing through tripping device 132 and/or circuit protection device 122. Alternatively, sensor 130 is a temperature sensor that measures a temperature of tripping device 132 and/or circuit protection device 122, or of ambient air in close proximity to tripping device 132 and/or circuit protection device 122. In some embodiments, sensor 130 is a humidity sensor 130 that measures a humidity or moisture content of ambient air surrounding, or in close proximity to, tripping device 132 and/or circuit protection device 122. In some embodiments, sensor 130 is a voltage sensor 130. Alternatively, sensor 130 may include a combination of temperature, humidity, voltage, and/or current sensors and/or any other type of sensor that enables power distribution system 104 to function as described herein. In an exemplary embodiment, each sensor 130 generates data representative of the measured current flowing through tripping device 132 and/or circuit protection device 122 (hereinafter referred to as "current data"). In addition, each sensor 130 transmits a signal including, or representing, the current data to a control system 128 associated with, or coupled to, tripping device 132. Each control system 128 is programmed to activate tripping device 132 to interrupt a current provided to a load 124 if the temperature data, humidity data, and/or any other operating condition data exceeds a programmable trip threshold.

In an exemplary embodiment, control systems 128 are also communicatively coupled to central controller 108. For example, in one embodiment, control systems 128 are directly coupled for communication with central controller 108. Alternatively, control systems 128 are coupled for communication with central controller 108 through a communication unit 134. Communication between control systems 128 and central controller 108 may also be provided through a hardwired communication link or through a wireless communication link. Control systems 128 collect measured operating condition data relating to a corresponding tripping device 132. For example, each control system 128 gathers measured operating condition data, such as measured current, voltage, temperature, and/or humidity data, from a sensor 130 associated with a tripping device 132 coupled to control system 128. In some embodiments, control system 128 periodically receives the measured operating condition data at a preselected frequency. For example, control system 128 receives temperature and/or humidity data at a frequency of about every minute, every hour, every day, or any other frequency. Control system 128 stores values representative of the temperature and/or humidity data in a memory 136 coupled to control system 128, and/or transmits the temperature and/or humidity data to central controller 108. In an alternative embodiment, some or all of the functionality of control systems 128 is incorporated into central controller 108.

Memory 136 stores program code and instructions, executable by control system 128, to control and/or monitor circuit protection device 122 and/or tripping device 132. In an exemplary embodiment, memory 136 includes non-volatile RAM to enable data stored in memory 136 to be retained after a power loss. Alternatively or additionally, memory 136 may include magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 136. Memory 136 may also be, or include, a detachable or removable memory, including, but not limited to, a suitable cartridge, disk, CD ROM, DVD or USB memory.

Circuit protection device 122 also includes a display device 138 coupled to control system 128. In an exemplary embodiment, display device 138 includes one or more light-emitting diodes (LEDs) that indicate a status of circuit protection device 122. For example, control system 128 may activate one or more components (e.g., LEDs) of display device 138 to indicate that current protection device 122 and/or tripping device 132 is active and/or operating normally, that a fault or failure has occurred, that a useful life of tripping device 132 or another component of circuit protection device 122 is below a threshold, and/or any other status of tripping device 132 and/or circuit protection device 122.

While circuit protection device 122 has been described in FIG. 2 with reference to switchgear units 106 of power distribution system 104, it should be recognized that circuit protection device 122, or any components thereof, may be used with any device or system. Additionally or alternatively, sensor 130 and control system 128 may monitor or measure operating conditions at, or in close proximity to, any other device or system other than tripping device 132.

Figure 3:
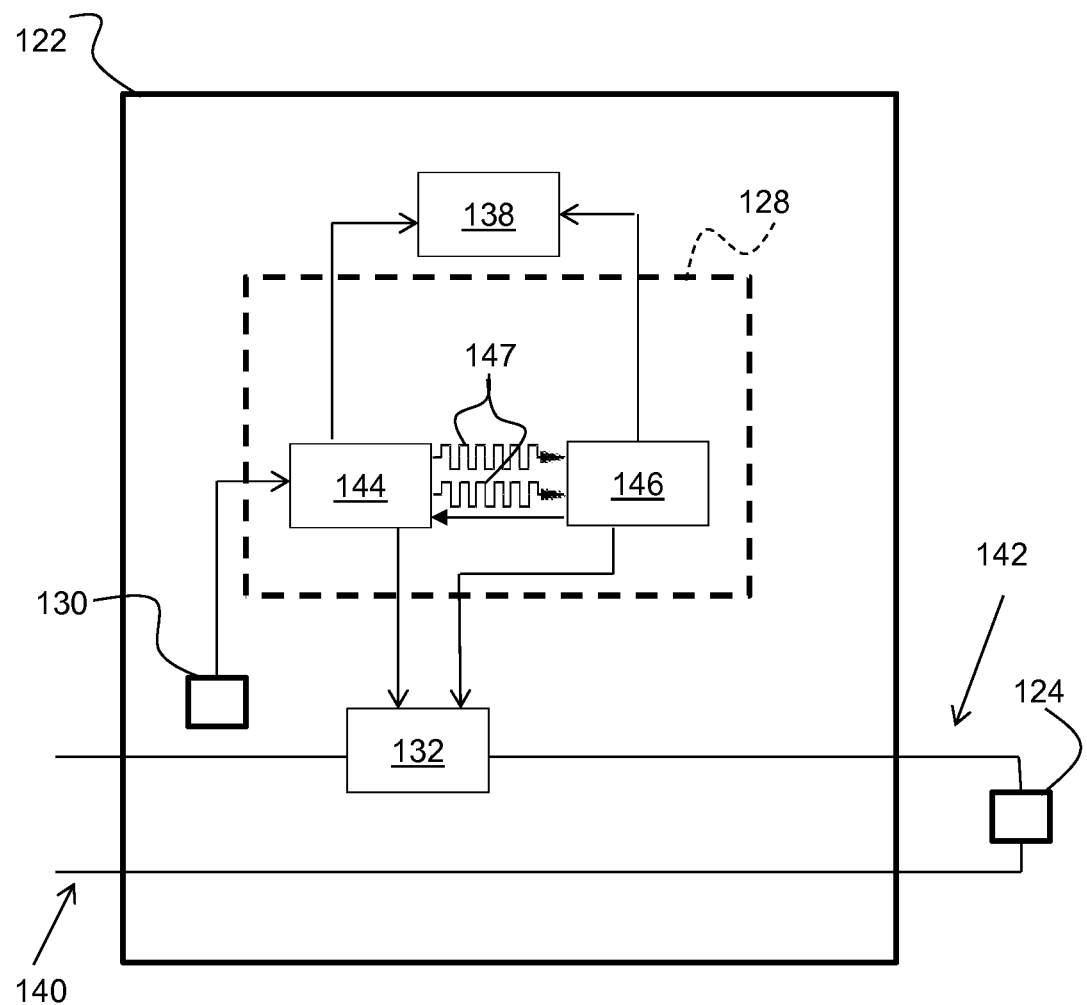
FIG. 3 is a diagram of an exemplary circuit protection device suitable for use with the power system shown in FIG. 1.

FIG. 3 is a schematic block diagram of an exemplary circuit protection device 122. In this exemplary embodiment, circuit protection device 122 is a circuit breaker, and control system 128 is a trip unit. Circuit protection device 122 includes an input terminal 140 to receive a power input, such as from main power feed 126, and an output terminal 142 to provide a power output to load 124. Tripping device 132 is coupled between input terminal 140 and output terminal 142. Tripping device 132 is configured to selectively interrupt a flow of electrical current between input terminal 140 and output terminal 142. Sensor 130 detects a characteristic associated with input terminal 140 and provides the characteristic, or a signal representative of the characteristic to control system 128. In the exemplary embodiment, sensor 130 detects an electric current through circuit protection device 122. In other embodiments, sensor 130 detects any other suitable characteristic of the power input to or output from circuit protection device 122. Control system 128 controls operation of tripping device 132 to selectively interrupt the flow of current between input terminal 140 and output terminal 142 based, at least in part, on the monitored characteristic. The exemplary embodiment is a one pole, single phase circuit protection device. In other embodiments, circuit protection device 122 is a two, three, or four pole circuit breaker coupled to more than one phase of electrical current and/or a neutral conductor. Moreover, in some embodiments, circuit protection device 122 includes more than one tripping device 132, e.g., one coupled to each phase conductor and/or a neutral conductor.

Control system 128 includes a first controller 144 and a second controller 146. First controller 144 receives the signal from sensor 130 and controls tripping device 132. In general, first controller 144 detects, via sensor 130, an overcurrent condition, a short circuit, or other fault. In response, first controller causes tripping device 132 to trip to interrupt the flow of current through circuit protection device 122. Control of a tripping device, such as tripping device 132, by a controller, such as first controller 144, is well known to those of ordinary skill in the art. Any suitable techniques for control of a tripping device by a controller may be used in connection with first controller 144 and tripping device 132.

In the exemplary embodiment, first controller 144 is configured to output a plurality of different health signals 147 as part of a health monitoring function of control system 128. In other embodiments, first controller 144 is configured to output a single health signal 147. In the exemplary embodiment, health signals 147 are output from first controller 144 to be received by second controller 146. In other embodiments, a different controller, such as a central controller 108, receives health signals 147 output by first controller 144. Each of health signals 147 output by first controller 144 corresponds to a different item of information regarding the health of the first controller. Health signals 147 can include, for example, a signal indicating the initialization state of the health monitoring function (also sometimes referred to as a watchdog initialization state signal), a health signal concerning a critical code section, a health signal concerning a non-critical code section, a health signal concerning the health of a power supply, a reset signal, and a health signal indicating a software mode of the first controller. The watchdog initialization state signal indicates to second controller whether or not the health monitoring function of first controller 144 is initialized. The critical and non-critical code section signals indicate whether or not critical and non-critical sections of code utilized by first controller 144 are being executed properly. The power supply health signal indicates whether or not a power supply, such as a power converter providing power to first controller 144, is operating properly. The software mode signal indicates the mode in which first controller is operating. For example, the software signal may indicate whether first controller 144 is operating in a normal mode, a test mode, a calibration mode, a maintenance mode, etc. In other embodiments, any other suitable health signals may be output by first controller 144. Moreover, although first controller 144 outputs all of the signals described above in the exemplary embodiment, in other embodiments, more or fewer health signals may be output by the first controller.

First controller 144 is configured to output health signals 147 as pulse width modulated (PWM) signals. In other embodiments, first controller 144 may output health signals 147 using any other suitable communication protocol. For example, first controller 144 may communicate health signals to second controller 146 using inter-integrated circuit protocol (I2C) or serial peripheral interface (SPI). In other embodiments, health signals may be output by first controller 144 as a constant logical high or logical low signal. In some embodiments, health signals 147 convey only two possible options. For example, the presence of a particular health signal 147 may indicate that first controller 144 is in a normal mode, while the absence of that particular signal 147 indicates that first controller 144 is not in a normal mode. In other embodiments, the health signal may convey information about more than two options. For example, a PWM health signal 147 may indicate the operational mode of first controller 144 via its duty cycle. Thus, for example, a fifty percent duty cycle may indicate normal operation mode, a twenty five percent duty cycle may indicate a test mode, and a seventy five percent duty cycle may indicate a calibration mode.

Second controller 146 receives the health signal(s) 147 from first controller 144 and determines, based at least in part on at least one of health signals 147, the existence of an undesired condition. For example, second controller 146 determines that a non-critical code section is not being properly executed in response to a health signal 147 associated with a non-critical code section, determines that a critical code section is not being properly executed in response to a health signal 147 associated with a critical code section, etc. The improper execution, or non-execution, of the critical or non-critical code section is an undesired condition. In the exemplary embodiment, the ultimate cause of the undesired condition is not determined. In other embodiments second controller is configured to determine why the undesired condition occurred and/or what caused the undesired condition. Receiving a health signal and making a determination based on the received health signal by second controller 146 includes detecting the absence of a particular health signal 147 and making a determination based on the absence of the signal.

Second controller 146 determines an action to be taken to remedy the undesired condition, i.e., return first controller 144 to the desired operation. Generally, the action to be taken will affect first controller 144 and/or tripping device 132. Moreover, in some embodiments, the action to be taken may include not taking any action. In the exemplary embodiment, the action to be taken to remedy the undesired condition is selected from resetting first controller 144, tripping tripping device 132 to interrupt a flow of current between input terminal 140 and output terminal 142, generating a fault indication, enabling one or more functions of first controller 144, disabling one or more functions of first controller 144, and shedding one or more loads 124 of first controller 144. In other embodiments, the action may be selected from more or fewer possible actions and may include any other suitable actions. For example, in some embodiments, the actions available for second controller 146 include, beyond simply resetting first controller 144, a soft reset of first controller 144 (by issuing a reset command), a warm reset of first controller 144 (by asserting a hardware reset signal). Second controller 146 may communicate with first controller 144 using any suitable communications protocols. For example, second controller 146 may communicate with first controller using I2C communications, SPI communications protocol, etc.

Rather than being limited to a single action, such as tripping tripping device 132 or resetting first controller 144, second controller 146 is configured to include a range of responses to a range of possible conditions indicated by the health signal(s) 147 received by second controller 146. In the exemplary embodiment, second controller 146 is configured to determine a series of actions to attempt to remedy the undesired condition. The series of actions are successively executed by second controller 146 to attempt to remedy the undesired condition. In some embodiments, second controller 146 will attempt to restore the desired operation of first controller 144, i.e., remedy the undesired operation, by determining and initiating a series of actions, each of which is more intrusive, severe, and/or disruptive than the previous action. In other embodiments, second controller 146 determines and initiates a series of actions in order of increasing likelihood of success in restoring the desired operation of first controller 144. Once an action restores the desired operation of first controller 144, the second controller generally ceases taking action to remedy the undesired condition.

Thus, for example, if a health signal 147 associated with a non-critical code section (for example a communication function) indicates that the code section is not operating properly, second processor may first disable and then re-enable the particular function associated with the code section to attempt to return the section to proper operation. If this action is unsuccessful, the second controller 146 may disable the function, either directly or by instructing first controller 144 to disable the function, and provide an indication that an error has occurred. First controller 144 and trip unit 128, however, continue to operate, but with limited functionality.

A different series of actions may be executed by second controller 146 when a health signal 147 concerning a critical code section indicates that the critical code section is not being properly executed. Critical code sections may relate to, for example, trip thresholds, current monitoring, communication with tripping device 132, etc. When a health signal 147 indicates that a critical code section is not being properly executed, second controller may attempt to restore proper execution by disabling and re-enabling the particular function/code section. If the attempt is unsuccessful, second controller 146 performs a soft reset of first controller 144. If the health signal 147 continues to indicate the critical code section is not being executed properly, second controller 146 performs a warm reset of first controller 144. If the warm reset does not restore proper operation, second controller may instruct first controller 144 to shed one or more of its loads 124. If this action is still unsuccessful, second controller 146 trips tripping device 132 and generates a fault indication. In other embodiments, second controller 146 generates a fault indication without tripping tripping device 132. The fault indication is a visible indication (e.g., a flashing light), an audible indication (e.g., a siren or buzzer), a communication to another processor (e.g., central controller 108), and/or activation of an output such as a dry contact. If any of the actions taken by second controller 146 resolve the problem indicated by the health signal(s) 147, second controller 146 ceases taking further actions from the escalating series of actions. Thus, for example, if a soft reset remedies the undesired condition, second controller 146 does not initiate a warm reset, instruct first controller 144 to shed a load 124, or trip tripping unit 132.

Action or inaction of second controller 146 is based on more than one health signal 147 in some instances. For example, when first controller 144 is operating in a calibration mode, it may be important that first controller 144 not be reset or otherwise interfered with. In one embodiment, if a critical code section health signal 147 indicates an error while the operation mode health signal 147 indicates operation in a calibration mode, second controller 146 generates a fault indication without any resetting of first controller 144 and without tripping tripping device 132. Alternatively, when first controller 144 is in maintenance mode operation, heightened sensitivity is generally desired due to the likely presence of people in the vicinity of protection device 122. Accordingly, in some embodiments, if a critical code section health signal 147 indicates an error while the operation mode health signal 147 indicates operation in a maintenance mode, second controller immediately trips tripping device 132 without taking any of the other possible actions.

Multiple health signals 147 may also be used by second controller 146 to more accurately determine the cause of an undesired condition, whether or not an undesired condition exists, and/or the action to be taken to remedy the undesired condition. In some embodiments, for example, a mode of operation may deliberately disable a communications function of first controller 144. If second controller 146 receives health signal 147 from first controller 144 indicating that the communication function is not operating (or its code section is not being executed), second controller 146 would ordinarily determine to initiate a series of actions to restore the functionality. Because, however, second controller 146 also receives the operation mode health signal 147 indicating first controller 144 is in the a mode that disables the communications function, second controller 146 is able to determine that there is no problem, that the disabled communications function is expected, and the action to be taken is to take no action.

Figure 4:
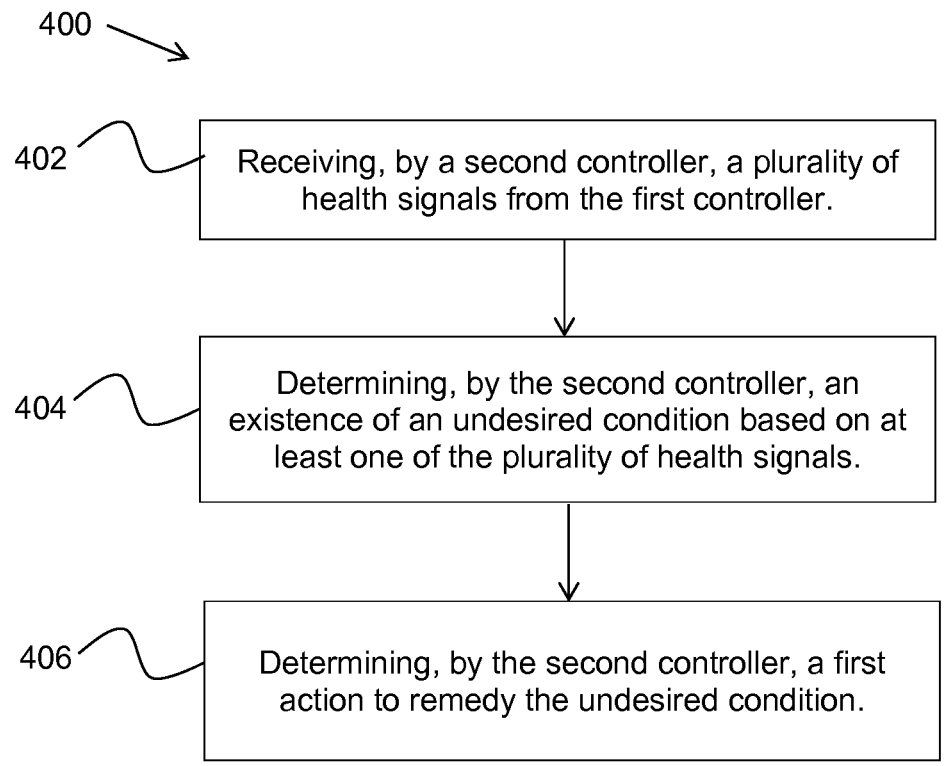
FIG. 4 is a flow chart of an exemplary method suitable for use with the exemplary circuit protection device shown in FIG. 3.

FIG. 4 is a flow chart of a method 400 for use in operating an electronic trip unit, such as trip unit 122, including a first controller. The first controller is configured to selectively operate a tripping device coupled between an input and an output of the electronic trip unit. The method includes receiving 402, by a second controller, a plurality of health signals from the first controller. The second controller determines 404 an existence of an undesired condition based on at least one of the plurality of health signals, and determines 406 a first action to be taken to remedy the undesired condition.

Described herein are exemplary apparatus, systems, and methods for operating a circuit protection device. More specifically, the methods, apparatus, and systems described herein facilitate health monitoring the primary controller in a trip unit. The described trip units provide more options in self correction, fault indication, and error indication than some known systems, while maintaining the main functionality of the trip unit during malfunctions in operation of the primary controller. The response by the secondary controller to a malfunction includes a series of successive actions of escalating intrusiveness into the operation of the circuit protection device, culminating, in some instances in tripping the tripping device in the circuit protection device. The described embodiments can result in a reduction in nuisance trips. Moreover, critical functionality may remain operational while malfunctioning, noncritical functionality is restored or shut off.

The methods and apparatus described herein facilitate efficient and economical operation of a circuit protection device. Exemplary embodiments of methods and apparatus are described and/or illustrated herein in detail. The methods and apparatus are not limited to the specific embodiments described herein, but rather, components of each apparatus, as well as steps of each method, may be utilized independently and separately from other components and steps described herein. Each component, and each method step, can also be used in combination with other components and/or method steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device configured to receive a power input and provide a power output, said circuit protection device comprising:
    an input terminal configured to receive the power input;
    an output terminal configured to provide the power output;
    a tripping device coupled between said input terminal and said output terminal and configured to selectively interrupt a flow of current between said input terminal and said output terminal; and
    a trip unit coupled to said tripping device, said trip unit comprising:
        a first controller configured to:
            monitor at least one characteristic associated with the power input;
            control said tripping device based at least in part on the monitored characteristic; and
            output a plurality of health signals associated with said first controller, wherein each of the plurality of health signals corresponds to a different item of information regarding the functioning of the first controller; and
        a second controller communicatively coupled to said first controller and said tripping device, said second controller configured to:
            determine, based at least in part on at least one of the plurality of health signals, an existence of an undesired condition of the first controller; and
            determine a first action to remedy the undesired condition.

2. A circuit protection device in accordance with claim 1, wherein said second controller is configured to determine the existence of the undesired condition based on an absence of at least one of the plurality of health signals.

3. A circuit protection device in accordance with claim 1, wherein said second controller is further configured to initiate the first action.

4. A circuit protection device in accordance with claim 3, wherein said second controller is further configured to determine one or more second actions to be taken to remedy the undesired condition.

5. A circuit protection device in accordance with claim 4, wherein said second controller is further configured to initiate the one or more second actions in response to a continued existence of the undesired condition after initiating the first action.

6. A circuit protection device in accordance with claim 1, wherein the plurality of different health signals that said first controller is configured to output are selected from at least one of an initialization state signal, a health signal associated with a critical code section, a health signal associated with a non-critical code section, a health signal associated with a power supply, a reset signal, and a software mode signal.

7. A circuit protection device in accordance with claim 1, wherein said second controller is configured to select the first action from at least one of resetting said first controller, tripping said tripping device to interrupt a flow of current between said input terminal and said output terminal, generating a fault indication, enabling one or more functions of said first controller, disabling one or more functions of said first controller, shedding one or more loads of said first controller, and store an indication of the undesired condition.

8. A method for controlling an electronic trip unit including a first controller configured to selectively operate a tripping device coupled between an input terminal and an output terminal of a circuit protection device, said method comprising:
    receiving, by a second controller, a plurality of health signals from the first controller, wherein each of the plurality of health signals corresponds to a different item of information regarding the functioning of the first controller;
    determining, by the second controller, an existence of an undesired condition of the first controller based on at least one of the plurality of health signals; and
    determining, by the second controller, a first action to remedy the undesired condition.

9. A method in accordance with claim 8, wherein said determining an existence of an undesired condition comprises determining an existence of an undesired condition based on an absence of at least one of the plurality of health signals.

10. A method in accordance with claim 8, wherein said method further comprises initiating, by the second controller, the determined first action.

11. A method in accordance with claim 10, wherein said method further comprises determining and initiating one or more second actions to be taken to remedy the undesired condition based on a continued existence of the undesired condition after initiating the first action.

12. A method in accordance with claim 8, wherein determining a first action comprises determining a series of actions of increasing intrusiveness to remedy the undesired condition.

13. A method in accordance with claim 12, wherein said method further comprises successively initiating, by the second controller, the series of actions.

14. A method in accordance with claim 8, wherein said determining a first action to be taken comprises determining a first action from at least one of resetting the first controller, tripping the tripping device to interrupt a flow of current, generating a fault indication, enabling one or more functions of the first controller, disabling one or more functions of the first controller, and shedding one or more loads of the first controller.

15. A trip unit for use with a circuit protection device, the circuit protection device comprising an input terminal, an output terminal, and a tripping device coupled between the input terminal and the output terminal, said trip unit comprising:
- a first controller configured to control the tripping device; and output a plurality of health signals associated with the different item of information regarding the functioning of said first controller; and
- a second controller communicatively coupled to said first controller and the tripping device, said second controller configured to:
  - determine an existence of an undesired condition of the first controller based, at least in part on the health signal; and
  - determine a plurality of actions to remedy the undesired condition.

16. A trip unit in accordance with claim 15, wherein said second controller is further configured to initiate a first action of the plurality of actions.

17. A trip unit in accordance with claim 16, wherein said second controller is further configured to initiate a second action of the plurality of actions in response to a continued existence of the undesired condition after initiating the first action.

18. A trip unit in accordance with claim 15, wherein the plurality of health signals are selected from at least one of an initialization state signal, a health signal associated with a critical code section, a health signal associated with a non-critical code section, a health signal associated with a power supply, a reset signal, and a software mode signal.

19. A trip unit in accordance with claim 15, wherein said second controller is configured to select the plurality of actions from resetting said first controller, tripping said tripping device to interrupt a flow of current between said input terminal and said output terminal, generating a fault indication, enabling one or more functions of said first controller, disabling one or more functions of said first controller, and shedding one or more loads of said first controller.

20. A trip unit in accordance with claim 15, wherein said second controller is configured to determine a series of successive, increasingly intrusive actions as the plurality of actions to remedy the undesired condition.

\* \* \* \* \*